United States Patent
Rist et al.

[11] Patent Number: 5,193,904
[45] Date of Patent: Mar. 16, 1993

[54] LAMP SAFETY RETAINER

[75] Inventors: Earl C. Rist, Bloomfield; Matthew P. Roy, Garfield; Luis M. Guzman, North Bergen, all of N.J.

[73] Assignee: Kurt Versen Company, Westwood, N.J.

[21] Appl. No.: 943,728

[22] Filed: Sep. 11, 1992

[51] Int. Cl.5 .............................................. F21N 21/00
[52] U.S. Cl. ..................................... 362/376; 362/260; 362/378
[58] Field of Search ............... 362/147, 216, 226, 260, 362/376, 377, 378, 404, 438

[56] References Cited

U.S. PATENT DOCUMENTS

| | | | |
|---|---|---|---|
| 1,151,219 | 8/1915 | Scherer | 362/378 X |
| 2,003,507 | 6/1935 | Guljas, Jr. | 173/350 |
| 2,421,057 | 5/1947 | Dunkelberger | 362/376 X |
| 2,476,641 | 7/1949 | Leighton | 29/747 |
| 3,694,649 | 9/1972 | Thompson | 362/390 |
| 3,723,945 | 3/1973 | Detch | 339/54 |
| 4,387,417 | 6/1983 | Plemmons et al. | 362/376 |
| 4,500,946 | 2/1985 | Mikola | 362/226 |
| 4,703,406 | 10/1987 | Elliott et al. | 362/365 |
| 4,704,668 | 11/1987 | Kosek | 362/390 |
| 4,811,183 | 3/1989 | Guritz et al. | 362/377 |
| 4,819,133 | 4/1989 | Kochi et al. | 362/61 |
| 4,878,159 | 10/1989 | Blaisdell et al. | 362/222 |
| 4,970,632 | 11/1990 | Tseng | 362/226 |
| 5,075,832 | 12/1991 | Pace | 362/376 |

Primary Examiner—Stephen F. Husar
Attorney, Agent, or Firm—Samuelson & Jacob

[57] ABSTRACT

A lamp safety retainer includes resiliently flexible retainer elements located beneath the base of a vertically oriented compact fluorescent lamp coupled with a lamp socket in a luminaire so as to intercept the base upon inadvertent uncoupling of the lamp from the lamp socket to preclude fall of the uncoupled lamp from the luminaire, while enabling selective flexing of the retainer elements for deliberate removal and replacement of the lamp in the luminaire.

17 Claims, 3 Drawing Sheets

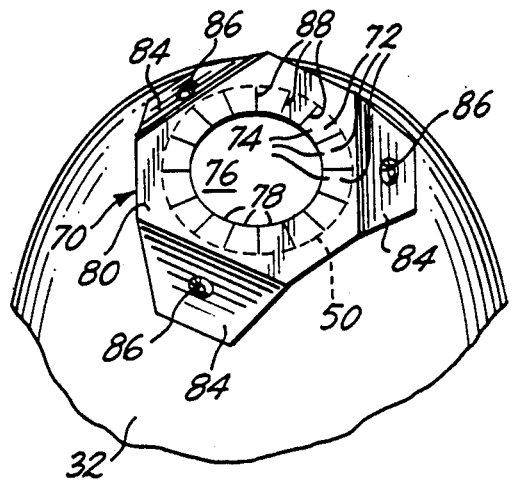
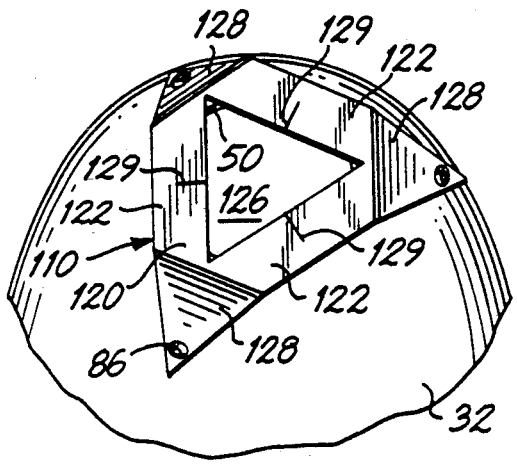
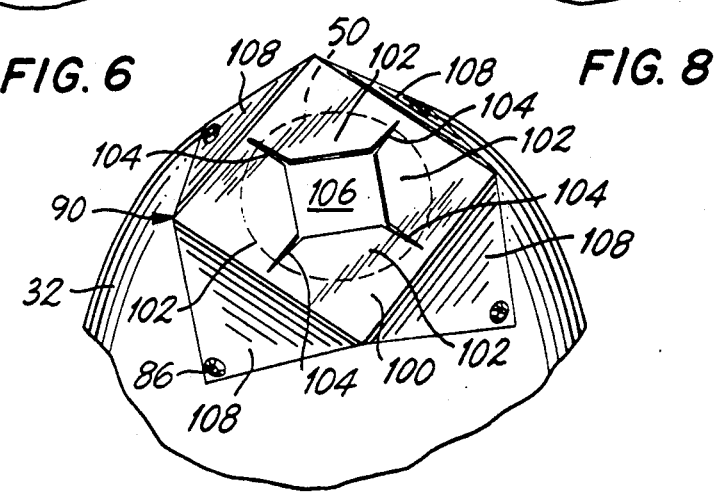
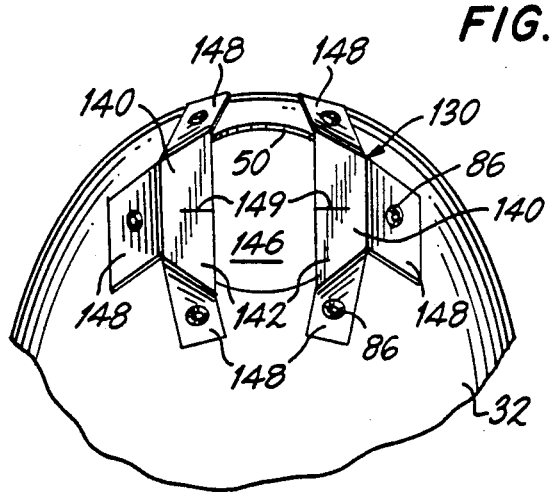
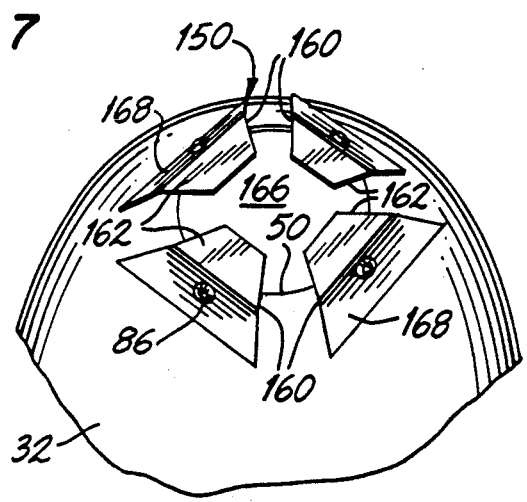
FIG. 6
FIG. 8
FIG. 7
FIG. 9
FIG. 10

LAMP SAFETY RETAINER

The present invention relates generally to luminaires and pertains, more specifically, to a safety retainer for preventing the fall of a lamp from a luminaire upon inadvertent uncoupling of the lamp from a complementary socket in the luminaire.

The current emphasis upon energy conservation has led to the development of more energy efficient luminaires. The compact fluorescent lamp has become a lamp of choice for energy efficiency, and a variety of luminaires have been constructed utilizing the compact fluorescent lamp as a light source. Among these luminaires are downlights in which the compact fluorescent lamp is mounted in a vertical position with the lamp envelope extending downwardly from the lamp base. In such an arrangement, the lamp base is coupled with a complementary lamp socket and is held in place within the socket by means of complementary detents in the lamp socket and the lamp base. While the detent coupling arrangement generally is adequate to maintain the lamp base coupled with the lamp socket in the variety of lamp orientations encountered in different installations, experience has shown that in downlights in which the compact fluorescent lamp is oriented vertically, with the lamp envelope projecting downwardly from the lamp base, inadvertent uncoupling of the lamp from the socket can occur, resulting in the lamp falling from the luminaire. Such an occurrence, at the very least, can result in destruction of the lamp and, at worst, can cause damage to equipment and injury to persons beneath the luminaire, in the path of a falling lamp.

The present invention provides a safety retainer arrangement for preventing the fall of an inadvertently uncoupled compact fluorescent lamp from a luminaire and, as such, exhibits several objects and advantages, some of which are summarized as follows: Provides a simple arrangement easily incorporated into current luminaire constructions for effectively precluding the fall of a compact fluorescent lamp from the luminaire upon inadvertent uncoupling of the lamp from the lamp socket of the luminaire; catches a dropped inadvertently uncoupled lamp so as to prevent destruction of the lamp, as well as damage to adjacent equipment and injury to persons beneath the luminaire, in the path of the falling uncoupled lamp, without impeding selective removal and replacement of the lamp; is readily employed in connection with a wide variety of luminaire constructions without requiring extensive modification of existing luminaire designs; introduces no adverse effects in the lighting performance of the luminaire into which the arrangement is incorporated; is relatively inexpensive and easily adapted to current luminaire constructions for immediate and widespread use.

The above objects and advantages, as well as further objects and advantages, are attained by the present invention which may be described briefly as a safety retainer for a luminaire of the type including a lamp socket and a compact fluorescent lamp having a lamp base normally received within the lamp socket and a lamp envelope extending longitudinally downwardly from a near end at the lamp base to a far end away from the lamp base, the lamp base having an outer periphery including at least portions extending laterally outwardly beyond the lamp envelope adjacent the near end of the lamp envelope, the safety retainer comprising: resiliently flexible retainer elements affixed to the luminaire and having retainer portions at retainer locations placed laterally inwardly beneath the lamp socket to establish an aperture through which the lamp envelope projects when the lamp is in the luminaire, at least portions of the aperture at the retainer locations being laterally smaller than corresponding portions of the outer periphery of the lamp base and placed beneath the corresponding portions of the outer periphery of the lamp base when the lamp is received within the lamp socket for interception of the lamp base by the retainer elements should the lamp base fall from the lamp socket; the resilient flexibility of the retainer elements being such that the lamp will be supported by the retainer elements against falling downwardly through the safety retainer, and will enable deliberate resilient dilation of the aperture at the retainer locations to permit selective movement of the lamp base through the safety retainer for removal and replacement of the lamp in the luminaire.

The invention will be understood more fully, while still further objects and advantages will become apparent, in the following detailed description of preferred embodiments of the invention illustrated in the accompanying drawing, in which:

FIG. 6 is a fragmentary perspective view of a component part of the luminaire of FIG. 1 with the lamp safety retainer affixed thereto; and FIGS. 7 through 10 are views similar to FIG. 6, but illustrating alternate embodiments of the lamp safety retainer.

Figure 1:
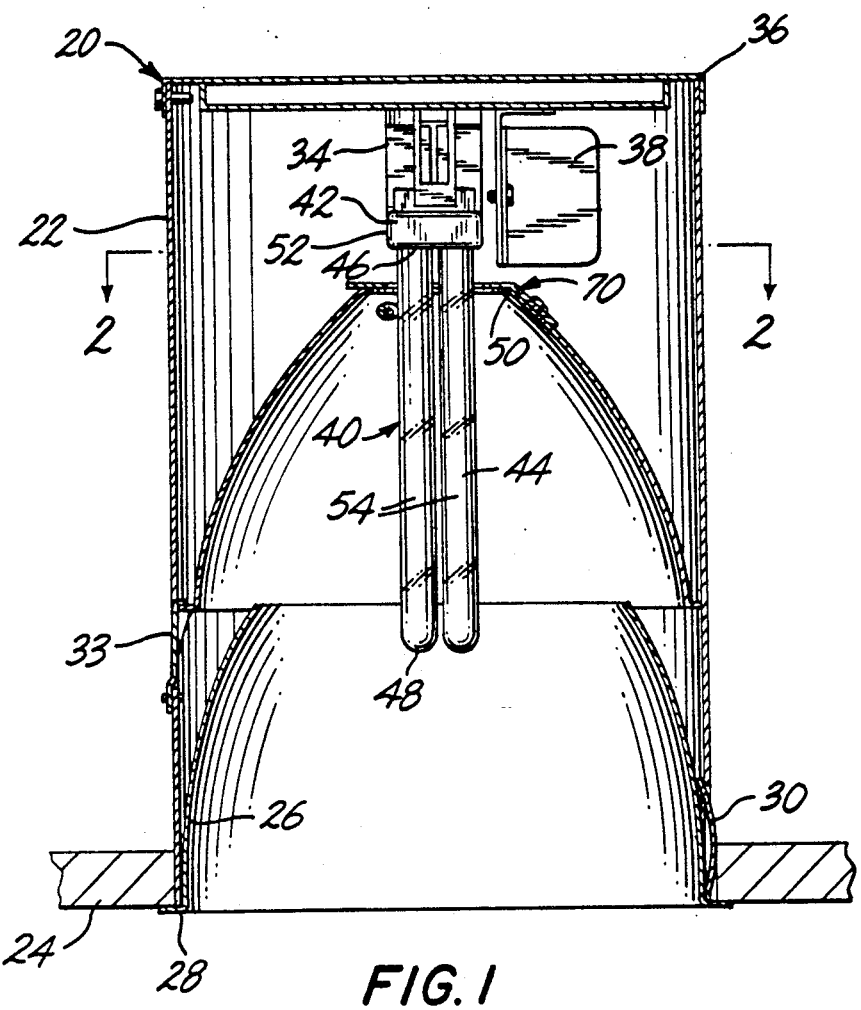
FIG. 1 is an elevational, longitudinal cross-sectional view of an installed luminaire employing a lamp safety retainer constructed in accordance with the invention.
Figure 2:
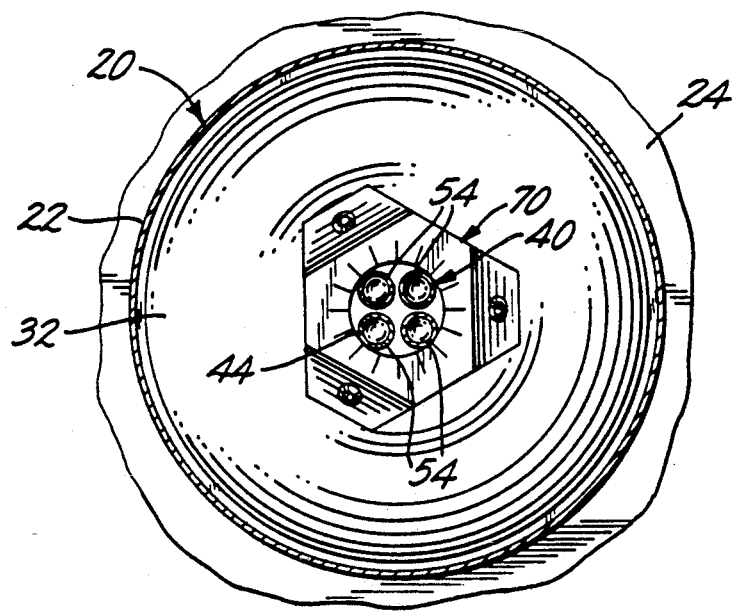
FIG. 2 is a cross-sectional view taken along line 2—2 of FIG. 1.

Referring now to the drawing, and especially to FIGS. 1 and 2 thereof, a luminaire in the form of a downlight is illustrated generally at 20 and is seen to include a generally tubular housing 22 placed within a ceiling 24. A specular cone 26 is located adjacent the lowermost end 28 of the housing 22 and is secured in place by means of spring clips, one of which spring clips is shown at 30. A reflector 32 is placed immediately above the specular cone 26 and is affixed within housing 22 by clips, one of which clips is illustrated at 33. A lamp socket 34 is mounted in the housing 22 adjacent the uppermost end 36 of the housing 22 and a ballast 38 is secured in the housing 22 near the lamp socket 34 and is connected electrically with the lamp socket 34.

A compact fluorescent lamp 40 provides the light source for downlight 20 and includes a lamp base 42 and a lamp envelope 44. Compact fluorescent lamp 40 is oriented in a vertical direction with lamp base 42 received within and coupled with the lamp socket 34 and lamp envelope 44 extending longitudinally downwardly from a near end 46 at the lamp base 42 to a far end 48 away from the lamp base 42 so as to project through an opening 50 in the reflector 32 for appropriate location of the light source relative to the reflector 32. The lamp base 42 has an outer periphery 52, at least portions of which outer periphery 52 extend laterally outwardly beyond the lamp envelope 44, adjacent the near end 46 of the lamp envelope 44, but not laterally outwardly beyond the perimeter of opening 50. Thus, lamp 40 is able to be moved in vertical directions through opening 50, as when lamp 40 is removed from downlight 20 and replaced. The lamp envelope 44 is seen to have four tubular branches 54; however, other lamp envelope configurations are available.

Figure 3:
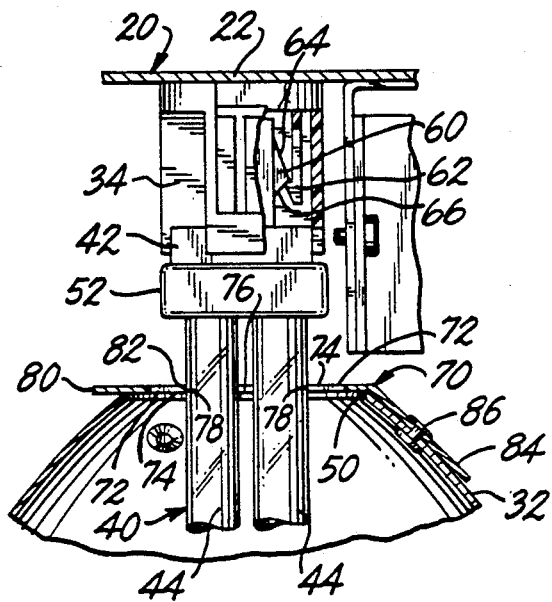
FIG. 3 is an enlarged fragmentary view of a portion of FIG. 1, partially cut away to illustrate internal details.

Turning now to FIG. 3, lamp base 42 is coupled with lamp socket 34 by reception within lamp socket 34 and is secured within lamp socket 34 by means of a detent arrangement which includes first detent elements in the form of lateral protuberances 60 (also see FIG. 5) unitary with the lamp base 42 and second detent elements in the form of latches 62 (only one of which is illustrated in FIG. 3) unitary with the lamp socket 34 and complementary with corresponding protuberances 60. When lamp base 42 is seated properly within lamp socket 34, an appropriate electrical connection is established between the ballast 38 and the lamp 40 and each latch 62 engages a corresponding protuberance 60 to maintain the lamp 40 coupled with the lamp socket 34 for operation of the downlight 20.

In order to facilitate insertion and removal of lamp 40, as for installation and replacement of the lamp 40 in downlight 20, the protuberances 60 each include a tapered profile configuration which provides an in-ramp 64 and an out-ramp 66. The in-ramp 64 facilitates displacement of each latch 62 to pass over a corresponding protuberance 60 upon insertion of a lamp base 42 into the lamp socket 34. The out-ramp 66 enables displacement of each latch 62 to pass over a corresponding protuberance 60 upon pulling the lamp 40 to remove the lamp base 42 from the lamp socket 34 for selective replacement of the lamp 40. However, experience has demonstrated that the same construction which facilitates selective removal of the lamp 40 from the lamp socket 34 also allows occasional inadvertent uncoupling of the lamp base 42 from the lamp socket 34, resulting in the lamp 40 dropping freely and falling out of the downlight 20. Upon such an occurrence, the lamp 40 usually will be destroyed, and can cause damage to equipment and even injury to persons located beneath the downlight 20, in the path of the falling lamp 40.

Figure 4:
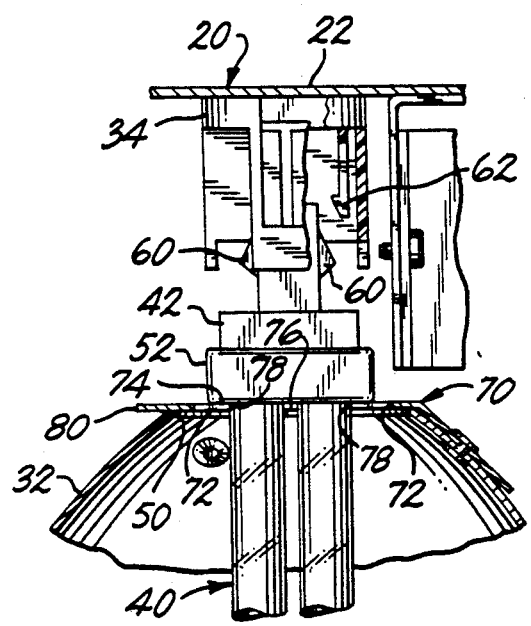
FIG. 4 is a view similar to FIG. 3, but with the illustrated components in another position.
Figure 5:
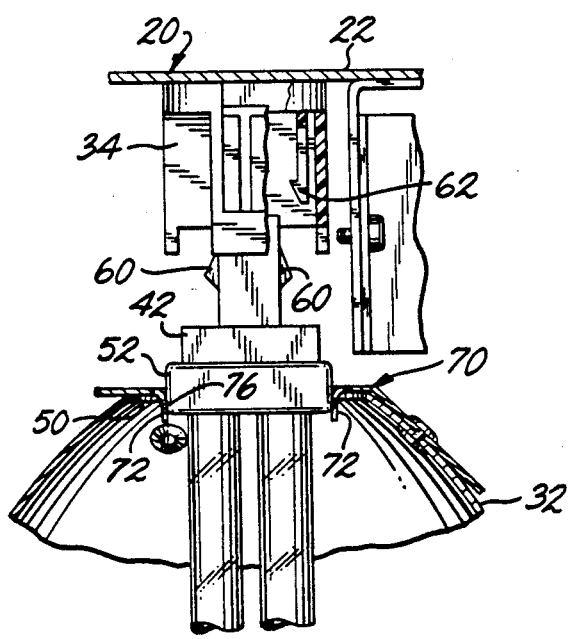
FIG. 5 is a view similar to FIG. 3, but with the illustrated components in still another position.

The present invention prevents the destruction, damage and injury previously experienced upon inadvertent uncoupling of the lamp 40 from the lamp socket 34. Thus, referring now to FIGS. 4 through 6, as well as to FIGS. 1 through 3, a safety retainer 70 includes resiliently flexible retainer elements in the form of radially inwardly projecting resiliently flexible fingers 72 providing retainer portions 74 at retainer locations placed laterally inwardly beneath the lamp socket 34 and establishing an aperture 76 through which the lamp envelope 44 projects when the lamp 40 is coupled properly with the lamp socket 34 for operation in the downlight 20. Fingers 72 include finger tips 78 confronting aperture 76 and at least portions of the aperture 76 are laterally smaller than corresponding portions of the outer periphery 52 of the lamp base 42 so that should the lamp base 42 become uncoupled inadvertently from the lamp socket 34 and the lamp 40 drop, the lamp base 42 will be intercepted by the retainer portions 74 of the fingers 72, as illustrated in FIG. 4. The resilient flexibility of the fingers 72 is such that the lamp 40 is then supported by the fingers 72 against falling downwardly through the safety retainer 70 and the lamp 40 will not fall from the downlight 20. However, when it is desired to remove the lamp 40 from the downlight 20, as for periodic replacement of the lamp 40, deliberate movement of the lamp base 4 through the aperture 76 is permitted by the flexible nature of the fingers 72. Thus, pulling downwardly upon the lamp 40, by application of a downward force F upon the lamp 40, as illustrated in FIG. 5, will flex the fingers 72 to resiliently dilate aperture 76 and permit passage of the lamp base 42 downwardly through the aperture 76 in the safety retainer 70 for deliberate removal of the lamp 40 from the downlight 20. Conversely, passage of the lamp base 42 upwardly through the aperture 76 is permitted by resilient dilation of aperture 76 for insertion of a lamp 40 into the downlight 20.

As best seen in FIG. 6, safety retainer 70 preferably is constructed of a unitary sheet-like member 80 and is affixed to reflector 32 s that aperture 76 is juxtaposed with the opening 50 in the reflector 32. In the preferred embodiment, aperture 76 is just large enough to permit the projection of the lamp envelope 44 through the aperture 7 and is generally complementary to the corresponding portion 82 (see FIG. 3) of lamp envelope 44 at the aperture 76 so that the fingers 72 extend inwardly to assure interception of the lamp base 42 by the fingers 72 as described above. Since such inward extension of the fingers 72 ordinarily will result in at least some contact between at least some of the finger tips 78 and the lamp envelope 44, at least the finger tips 78 are constructed of a non-metallic material. Thus, member 80 preferably is constructed of a sheet of heat-resistant polymeric material, the preferred polymeric material being an aramid paper available commercially under the trademark NOMEX. The resilient characteristics of the selected material provide sufficient stiffness to catch and support an uncoupled, dropped lamp 40, while providing the flexibility needed for selective removal and replacement of lamp 40. Member 80 includes three ears 84 affixed to the reflector 32 by means of fasteners, shown in the form of rivets 86. A plurality of slits 88 in member 80 extend radially outwardly from aperture 76 and establish fingers 72 unitary with member 80 and arranged around the generally circular aperture 76 in an array of a plurality of contiguous fingers 72 so as to provide sufficient support for an inadvertently uncoupled lamp 40, while enabling deliberate flexing for facilitating removal and replacement of the lamp 40.

In an alternate embodiment illustrated in FIG. 7, safety retainer 90 is in the form of a unitary member 100 constructed of a sheet of aramid paper and includes resiliently flexible retainer elements in the form of four contiguous fingers 102 delineated by slits 104 and establishing an essentially square aperture 106. Four ears 108 are affixed to the reflector 32 so as to place the aperture 106 in appropriate juxtaposition with the opening 50 in the reflector 32 for operation of safety retainer 90 in a manner similar to that described above in connection with safety retainer 70.

In the embodiment of FIG. 8, safety retainer 110 is in the form of a unitary member 120 constructed of a sheet of aramid paper and includes resiliently flexible retainer elements in the form of three bands 122 establishing a generally triangular aperture 126. Three ears 128 are affixed to the reflector 32 so as to juxtapose the aperture 126 with the opening 50 in the reflector 32 for operation of the safety retainer 110 in a manner similar to that described above in connection with the embodiments of FIGS. 1 through 7. A slit 129 extends radially outwardly intermediate the ends of each band 122 for enhancing flexibility of the retainer elements.

A alternate embodiment shown in FIG. 9 comprises a safety retainer 130 in which two discrete members 140 of aramid paper provide resiliently flexible retainer elements in the form of two bands 142 opposed to one another to establish an essentially rectangular aperture 146 between the bands 142. The bands 142 are affixed to reflector 32 by means of ears 148 so that the aperture 146 is juxtaposed with the opening 50 in the reflector 32 for operation of the safety retainer 130 in a manner similar to that described above. A slit 149 extends radially outwardly intermediate the ends of each band 142 for enhancing flexibility of the retainer elements.

In the embodiment illustrated in FIG. 10, safety retainer 150 includes four members 160 of aramid paper providing resiliently flexible retainer elements in the form of four fingers 162. Each finger 162 is affixed to the reflector 32 by means of a corresponding ear 168 so that an aperture 166 established by the fingers 162 is juxtaposed with the opening 50 in the reflector 32 for operation of the safety retainer 150 in a manner similar to that described above.

It will be seen that the present invention provides a safety retainer arrangement for preventing the fall of an inadvertently uncoupled compact fluorescent lamp from a luminaire and, as such, attains the several objects and advantages summarized above; namely: Provides a simple arrangement easily incorporated into current luminaire constructions for effectively precluding the fall of a compact fluorescent lamp from the luminaire upon inadvertent uncoupling of the lamp from the lamp socket of the luminaire; catches a dropped inadvertently uncoupled lamp so as to prevent destruction of the lamp, as well as damage to adjacent equipment and injury to persons beneath the luminaire, in the path of the falling uncoupled lamp, without impeding selective removal and replacement of the lamp; is readily employed in connection with a wide variety of luminaire constructions without requiring extensive modification of existing luminaire designs; introduces no adverse effects in the lighting performance of the luminaire into which the arrangement is incorporated; is relatively inexpensive and easily adapted to current luminaire constructions for immediate and widespread use.

It is to be understood that the above detailed description of preferred embodiments of the invention is provided by way of example only. Various details of design and construction may be modified without departing from the true spirit and scope of the invention as set forth in the accompanying claims.

The embodiments of the invention in which an exclusive property or privilege is claimed are defined as follows:

1. A safety retainer for a luminaire of the type including a lamp socket and a compact fluorescent lamp having a lamp base normally received within the lamp socket and a lamp envelope extending longitudinally downwardly from a near end at the lamp base to a far end away from the lamp base, the lamp base having an outer periphery including at least portions extending laterally outwardly beyond the lamp envelope adjacent the near end of the lamp envelope, the safety retainer comprising:

resiliently flexible retainer elements affixed to the luminaire and having retainer portions at retainer locations placed laterally inwardly beneath the lamp socket to establish an aperture through which the lamp envelope projects when the lamp is in the luminaire, at least portions of the aperture at the retainer locations being laterally smaller than corresponding portions of the outer periphery of the lamp base and placed beneath the corresponding portions of the outer periphery of the lamp base when the lamp is received within the lamp socket for interception of the lamp base by the retainer elements should the lamp base fall from the lamp socket;

the resilient flexibility of the retainer elements being such that the lamp will be supported by the retainer elements against falling downwardly through the safety retainer, and will enable deliberate resilient dilation of the aperture at the retainer locations to permit selective movement of the lamp base through the safety retainer for removal and replacement of the lamp in the luminaire.

2. The invention of claim 1 wherein the luminaire includes a reflector affixed to the luminaire and having an opening, the lamp socket is located above the opening and the lamp envelope projects downwardly through the opening when the lamp base is received in the lamp socket, and the safety retainer is affixed to the reflector so that the retainer elements extend into the opening.

3. The invention of claim 1 wherein the retainer elements comprise a plurality of radially inwardly projecting resiliently flexible fingers and the retainer portions are located on the flexible fingers adjacent the aperture.

4. The invention of claim 3 wherein the flexible fingers are located essentially contiguous with one another circumferentially around the aperture.

5. The invention of claim 3 wherein the flexible fingers include finger tips confronting the aperture and at least the finger tips include a non-metallic material.

6. The invention of claim 5 wherein the aperture is essentially complementary to corresponding portions of the lamp envelope.

7. The invention of claim 3 wherein the flexible fingers are constructed of a heat-resistant synthetic polymeric material.

8. The invention of claim 7 wherein the synthetic polymeric material is an aramid paper.

9. The invention of claim 1 wherein the safety retainer comprises a sheet-like member of resiliently flexible material, the aperture is located within the sheet-like member, and slits extend radially outwardly from the aperture into the sheet-like member to establish the resiliently flexible retainer elements integral with the sheet-like member.

10. The invention of claim 9 including a plurality of slits establishing a plurality of retainer elements unitary with the sheet-like member.

11. The invention of claim 10 wherein the retainer elements are located essentially contiguous with one another circumferentially around the aperture.

12. The invention of claim 10 wherein the luminaire includes a reflector affixed to the luminaire and having an opening, the lamp socket is located above the opening and the lamp envelope projects downwardly through the opening when the lamp base is received in the lamp socket and the safety retainer is affixed to the reflector so that the retainer elements extend into the opening.

13. The invention of claim 12 wherein the retainer elements comprise a plurality of radially inwardly projecting resiliently flexible fingers and the retainer portions are located on the flexible fingers adjacent the aperture.

14. The invention of claim 13 wherein the flexible fingers are located essentially contiguous with one another circumferentially around the aperture.

15. The invention of claim 13 wherein the sheet-like material is constructed of a heat-resistant synthetic polymeric material.

16. The invention of claim 15 wherein the aperture is essentially complementary to corresponding portions of the lamp envelope.

17. The invention of claim 15 wherein the synthetic polymeric material is an aramid paper.

* * * * *